Oct. 25, 1960 P. D. CAULFIELD 2,957,458
COWL FLAP ACTUATING MECHANISM

Filed Feb. 16, 1959 2 Sheets-Sheet 1

Phillip D. Caulfield
INVENTOR.

BY Clarence A.O'Brien
and Harvey B. Jacobson
Attorneys

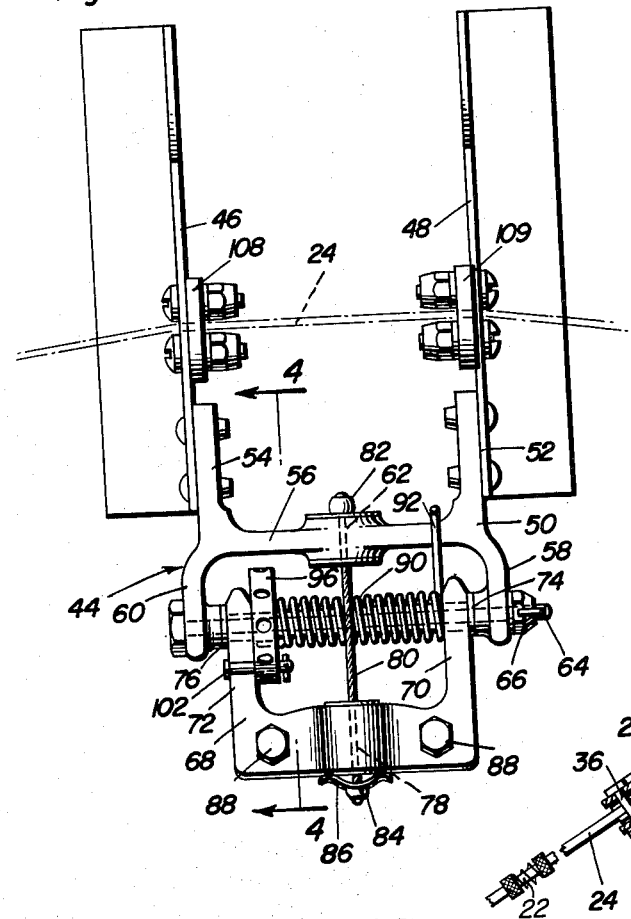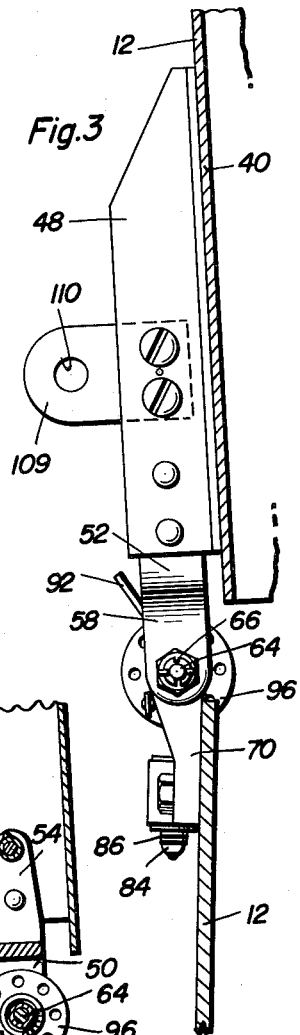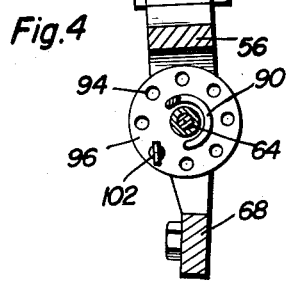

United States Patent Office 2,957,458
Patented Oct. 25, 1960

2,957,458
COWL FLAP ACTUATING MECHANISM
Phillip D. Caulfield, P.O. Box 4522, Spenard, Alaska
Filed Feb. 16, 1959, Ser. No. 793,474
6 Claims. (Cl. 123—41.7)

This invention relates to a new and useful cowl flap system for aircraft of various types.

An object of the invention is to provide an improved cowl flap system which is considerably lighter, using many less parts and more certain in operation than existing systems in airplanes. The cowl flap system in accordance with this invention may be used with a number of conventional airplanes such as the DC-3 and C-47 and any other airplane having a similar aircraft engine design. One of the principal differences between the system of this invention and existing equipment is that the cowl flap system operates with the aid of a cable control to close the cowl flaps. The original hydraulic system in the mentioned aircraft operates from the cockpit by placing the control in the desired position that is, open, trail and closed respectively. When the closed position is necessary, the valve is moved to the closed position in the cockpit, and this actuates a hydraulic cylinder mounted on the firewall in the engine nacelle to close the cowl flaps by retracting the cable of the invention.

This system has an arrangement of springs designed to open the cowl flaps when the valve is placed in the open position. When the trail position is required, the air stream travelling over the flaps overcomes the spring loading whereby the cowl flaps seek and obtain a trail position.

If for any reason, the cable should break or become otherwise ineffectual, the cowl flaps will open only to the trail position when in flight and when at very low speeds or when the airplane is on the ground, the cowl flaps will open automatically due to spring tension.

One of the obvious advantages of this type of system is the omission of all of the linkage, cowl cylinders, bearings, bushings, dog legs and the disconnects that presently exist in conventional cowl flap systems. By the omission of all of these parts, the system of the invention is free from wear in all of these parts and furthermore, there is practically no rigging once the system is installed.

As is always important, a material saving in weight of the aircraft is achieved. The number of man hours required for maintenance of existing cowl systems is tremendous. A material reduction in maintenance time is realized by the invention, there being essentially nothing to wear out in comparison with the old system organization.

Aerodynamically, the instant system is superior because the cowl flaps close symmetrically. Furthermore, there is less fire hazard since the existing cowl flap hydraulic lines in the power section of the aircraft nacelle are omitted especially in the exhaust stack area.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged elevational view of a cowl flap bracket and a portion of the means for operating the cowl flap bracket.

Figure 3 is a side elevational view of the structure in Figure 2, portions of the flap and nacelle shown in section.

Figure 4 is an enlarged sectional view taken on the line 4—4 of Figure 2.

Figure 6 is an enlarged sectional view taken on the line 6—6 of Figure 1.

Figure 7:
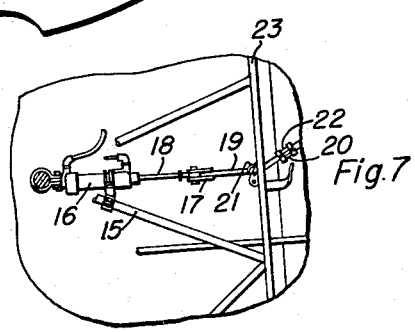
Figure 7 is a fragmentary side view showing a part of an airplane motor mount to which a hydraulic cylinder is secured, the cylinder being used to operate the cowl flap system.

In the accompanying drawings there is shown a part of an engine nacelle 10 for an aircraft, having an annular wall 12 which is part of the cowling. Hydraulic actuating cylinder 16 is suitably mounted on a structure, for example engine mount 15 (Figure 7), at one end and has a piston rod 18 that is axially movable in the cylinder and to which a pair of quick disconnect couplings 20 and 22 are connected by way of a conventional fastener 17 and short cables 19 guided around guide pulleys 21 carried by the engine mount dishpan 23. Cable 24 is secured at its ends to couplings 20 and 22, and it is guided over a pair of pulleys 26 annd 28 (Figure 6) that are mounted for free rotation on a pulley bracket 32. The pulley bracket is secured by a mounting bracket 34 to one of the flap actuating brackets or directly to one of the flaps. A guide pin 36 for the cables is attached to bracket 32 and is located between the ends of the cables to constrain them in their movement.

The cowl flaps 40 may be of any shape, for instance the usual conventional shape to form a cylindrical closure when in the closed position. Each flap has a flap mounting hinge assembly 44 by which it is mounted on annular wall 12. Each assembly 44 is identical in construction, there being one for each flap 40. The detailed typical assembly is shown in Figures 2–5 and consist of a pair of angular supports 46 and 48 rigidly attached, as being riveted, to the rear surface of a typical flap 40. Members 46 and 48 are spaced from each other and are secured to hinge support 50 which is an H-shaped member having sides 52 and 54 rigidly secured to members 46 and 48, a cross member 56 and sides 58 and 60 constituting substantial continuations of sides 52 and 54. Cross member 56 has a passageway 62 extending completely through it and at its center, while sides 58 and 60 have apertures by which to accommodate hinge pin 64. The hinge pin is preferably made of a bolt with a lock nut 66 at one end, the bolt extending through the hinge member 68. Hinge member 68 is approximately U-shaped with sides 70 and 72 having apertures through which the bolt hinge pin extends. Spacers 74 and 76 are disposed on the hinge pin 64 and located between sides 58, 70 and 60, 72. There is a passageway 78 in the center of hinge member 68 to which stop cable 80 extends. This cable has enlargements 82 and 84 at the opposite ends thereof, one being located on one side of passageway 62 and the other being located on the opposite side of passageway 78 and having a resilient leaf spring 86 interposed between the enlargement and a surface of hinge member 68. The hinge member 68 is attached by bolts 88 or equivalent fasteners to the annular wall 12.

An important part of the invention is embodied in torsion spring 90 disposed on hinge pin 64. One end 92 of the torsion spring bears against member 58, and the other end of the torsion spring is disposed in one of a group of apertures 94 in the spring adjuster disk 96. The disk 96 has peripheral wrench receiving openings 98 by which to turn the disk, and it has a central opening 100 through which hinge pin 64 passes. A stop pin 102 is extended through one of the apertures 94 and bears against the upper surface of side 72 of hinge member 68. Therefore, the torsion in spring 90 may be adjusted by adjusting disk 96 and locking it in the adjusted position by use of locking pin 102. The bias of the spring is in such a direction that it is transmitted through hinge member 50 to the flap 40 and in a direction to tend to hold the flap in the open position. It is now evident that the flap 40 is held normally open by spring 90.

Figure 1:
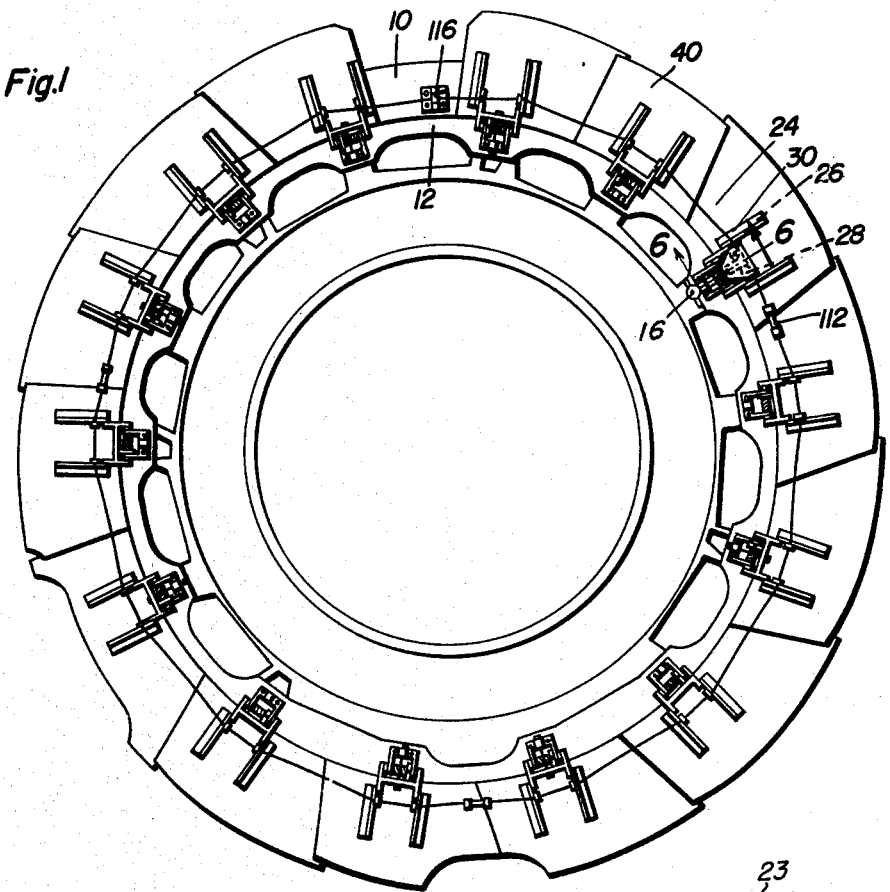
Figure 1 is a rear elevational view of a cowl flap system in accordance with the invention showing the same installed on an engine nacelle.
Figure 5:
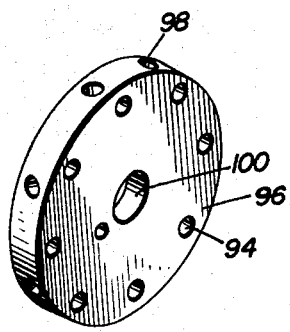
Figure 5 is a perspective view of a spring tension adjuster, there being one for each cowl flap.

Cable 24 functions to retract flaps 40. Each support 46 and 48 has a short block 108, bracket or the like bolted or otherwise fastened to a side thereof. As shown in Figure 2, there are brackets 108 and 109 secured to the two supports 46 and 48, and each is provided with an aperture 110 to which cable 24 passes. Since each bracket assembly 44 is identically constructed, the cable 24 is circularly arranged in the flap system with the ends of the cable attached to the hydraulic cylinder as described previously. A quick disconnect coupling 112 is interposed in the length of the cable (Figure 1) to facilitate rigging, and there is a guide 116 at an open space in the flap system to constrain the movement of the cable. It is now evident that when the hydraulic cylinder (which could be substituted by a pneumatic cylinder) is retracted, the cable 24 constitutes means for overcoming the tension of the spring 90 and pulling the flaps in the closed position. However, when the hydraulic cylinder is extended, the springs 90 cooperating with the hinge brackets and other described structure connected with each flap 40, function as means for opening the flaps.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a cowl flap assembly which has a plurality of flaps and a wall adjacent thereto, each flap provided with a hinge assembly having a hinge member secured to the flap and a hinge member secured to the wall, a hinge pin connecting said hinge members, resilient means reacting on said hinge members and applying a yielding force onto the hinge member which is attached to the flap and in a direction to open the flap, means including a cable associated with said flaps for simultaneously retracting the flaps against the yielding opposition of said resilient means, and adjustable means operatively connected with said resilient means for adjusting said resilient means.

2. In a cowl flap assembly which has a plurality of flaps and a wall adjacent thereto, each flap provided with a hinge assembly having a hinge member secured to the flap and a hinge member secured to the wall, a hinge pin connecting said hinge members, resilient means including a torsion spring reacting on said hinge members and applying a yielding force onto the hinge member which is attached to the flap and in a direction to open the flap, means for adjusting the tension of said torsion spring, means for simultaneously retracting the flaps against the yielding opposition of said resilient means, said retracting means including a cable, a cylinder which is fixed at one end and to which the ends of said cable are secured to operate said cables in a direction to close said flaps, and means connected with each flap for constraining the movement of said cable.

3. In a cowl flap assembly which has a plurality of flaps and a wall adjacent thereto, each flap provided with a hinge assembly having a hinge member secured to the flap and a hinge member secured to the wall, a hinge pin connecting said hinge members, resilient means reacting on said hinge members and applying a yielding force onto the hinge member which is attached to the flap and in a direction to open the flap, means for simultaneously retracting the flaps against the yielding opposition of said resilient means, said retracting means including a cable, a cylinder which is fixed at one end and to which the ends of said cable are secured to operate said cables in a direction to close said flaps, means connected with each flap for constraining the movement of said cable, said constraining means including structural members attached to the hinge members secured to said flaps and having cable guides.

4. The combination of claim 3 wherein said cable is arranged annularly behind said flaps, and further means connected with said cowl for constraining the movement of said cable.

5. The combination of claim 3 wherein there are means connected with each hinge assembly for limiting the hinged movement of the hinge members with reference to each other.

6. The combination of claim 3 wherein there are means connected with each hinge assembly for limiting the hinged movement of the hinge members with reference to each other, said resilient means including a torsion spring, and means for adjusting the tension of said torsion spring.

References Cited in the file of this patent

UNITED STATES PATENTS 2,289,616    Wojcik   ---------------- July 14, 1942

FOREIGN PATENTS 480,478    Great Britain ----------- Feb. 23, 1938